(12) United States Patent
Abrahams

(10) Patent No.: US 10,814,870 B2
(45) Date of Patent: Oct. 27, 2020

(54) MULTI-HEADED RECURRENT NEURAL NETWORK (RNN) FOR MULTI-CLASS TRAJECTORY PREDICTIONS

(71) Applicant: GM GLOBAL TECHNOLOGY OPERATIONS LLC, Detroit, MI (US)

(72) Inventor: Samuel Abrahams, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 16/209,935

(22) Filed: Dec. 4, 2018

(65) Prior Publication Data

US 2020/0172098 A1    Jun. 4, 2020

(51) Int. Cl.

| | |
|---|---|
| *B60W 30/095* | (2012.01) |
| *B60W 30/09* | (2012.01) |
| *G05D 1/00* | (2006.01) |
| *G05D 1/02* | (2020.01) |
| *G06N 3/04* | (2006.01) |
| *G06N 3/08* | (2006.01) |
| *G06N 20/20* | (2019.01) |

(52) U.S. Cl.
CPC ........ *B60W 30/0956* (2013.01); *B60W 30/09* (2013.01); *G05D 1/0088* (2013.01); *G05D 1/0221* (2013.01); *G06N 3/0454* (2013.01); *G06N 3/084* (2013.01); *G06N 20/20* (2019.01)

(58) Field of Classification Search
CPC ...... G05D 1/0221; G05D 1/0088; G06N 3/02; G06N 3/08; G06N 20/00; B60W 30/095; B60W 30/0956
See application file for complete search history.

(56) References Cited

U.S. PATENT DOCUMENTS

| 10,216,189 B1* | 2/2019 | Haynes | ............... G06K 9/00805 |
|---|---|---|---|
| 2013/0223686 A1* | 8/2013 | Shimizu | ................. G08G 1/166 |
| | | | 382/103 |

(Continued)

OTHER PUBLICATIONS

Alahi, et al. "Social LSTM: Human Trajectory Prediction in Crowded Spaces", 2016, 11 Pages.

(Continued)

*Primary Examiner* — Thomas G Black
*Assistant Examiner* — Sara J Lewandroski
(74) *Attorney, Agent, or Firm* — Medley, Behrens & Lewis, LLC

(57) ABSTRACT

Described herein are various technologies that pertain to controlling an AV based upon a neural-network-generated prediction of a trajectory (e.g., one or more future positions) of an object in the driving environment of the AV. With more specificity, described herein are various technologies pertaining to generating predictions of a trajectory of an object by way of a multi-headed recurrent neural network (RNN). The multi-headed RNN is configured to output probability data that indicates a probability of an object moving to a position at a future point in time when the object has each of a plurality of different object characteristics. The multi-headed RNN is further configured to use state information of the multi-headed RNN from prior predictions of a trajectory of an object in connection with generating a future prediction of a trajectory of the object.

20 Claims, 9 Drawing Sheets

(56) References Cited

U.S. PATENT DOCUMENTS

| | | | |
|---|---|---|---|
| 2013/0293395 A1* | 11/2013 | Ohama | B60Q 9/008 |
| | | | 340/904 |
| 2017/0064515 A1* | 3/2017 | Heikkila | H04W 4/021 |
| 2019/0025841 A1* | 1/2019 | Haynes | G01C 21/20 |
| 2019/0152490 A1* | 5/2019 | Lan | B60W 60/00276 |
| 2020/0012285 A1* | 1/2020 | Delp | G06K 9/00805 |
| 2020/0086888 A1* | 3/2020 | Engle | G05D 1/0088 |
| 2020/0103523 A1* | 4/2020 | Liu | G01S 13/867 |
| 2020/0116495 A1* | 4/2020 | Yasui | G09B 29/00 |
| 2020/0150665 A1* | 5/2020 | Refaat | G05D 1/0088 |
| 2020/0174481 A1* | 6/2020 | Van Heukelom | |
| | | | B60W 30/0956 |
| 2020/0174486 A1* | 6/2020 | Luo | G05D 1/0221 |

OTHER PUBLICATIONS

Deo, et al. "Multi-Modal Trajectory Prediction of Surrounding Vehicles with Maneuver based LSTMs," May 15, 2018, 6 Pages.

\* cited by examiner

MULTI-HEADED RECURRENT NEURAL NETWORK (RNN) FOR MULTI-CLASS TRAJECTORY PREDICTIONS

BACKGROUND

An autonomous vehicle (AV) is a motorized vehicle that can operate without a human driver. An exemplary AV includes a plurality of sensor systems, such as but not limited to, a lidar sensor system, a camera sensor system, and a radar sensor system, amongst others. The AV operates based upon sensor signals output by the sensor systems.

In connection with operating in a live driving environment (e.g., a public street or highway), conventionally AVs operate based upon predictions of the behavior of various objects in the driving environment at future points in time. For example, a control system of an AV can determine whether the AV will make a left turn based on a predicted position of a vehicle in a lane of oncoming traffic. The predicted position of the oncoming vehicle can be determined based upon sensor signals output by the sensor systems, assumptions about the behavior of objects in the driving environment, etc.

In some AVs, neural networks are used to predict movement of objects in the driving environment at future times. Conventionally, however, these neural network approaches have exhibited poor performance in predicting the position of an object when there is uncertainty as to a type of the object. In an example, pedestrians and cyclists may have similar signatures in sensor signals output by the various sensor system of an AV. Accordingly, a classification system of the AV may be unable to determine with high confidence whether an object in the driving environment is a pedestrian or a cyclist. Conventional neural-network-based approaches have generally been unable to predict future positions of objects of potentially uncertain type (e.g., pedestrians and cyclists) with high confidence.

Some neural network approaches to predicting a trajectory of an object make use of separate neural networks for each of a variety of types of object. For instance, an AV can be configured to distinguish among motor vehicles, motorcycles, cyclists, and pedestrians. The AV can include a separate neural network for predicting positions of each of motor vehicles, motorcycles, cyclists, and pedestrians. In connection with generating a prediction of a future position of an object, the AV can execute each of the neural networks to generate separate predictions of the future position of the object. Whether the neural networks are executed in parallel or serially, the execution of multiple neural network models for each of several object types to determine a future position of an object may be prohibitively expensive in time or computing resources.

Furthermore, a historical state of a neural network (e.g., outputs of a layer of the neural network) generated in connection with generating a prediction cannot easily be incorporated into the input to another neural network. Hence, when the object type classification of the object as generated by a classification system of the AV changes from a first type to a second type, state history of a first neural network is not easily used in generating trajectory predictions by way of a second neural network.

In other neural network approaches, a single neural network can be configured to output predictions of future object locations for multiple potential types of object. In these single-network approaches to trajectory prediction, however, the predictions generated by the neural network are relatively inaccurate (e.g., a true prediction is associated with a low confidence value, or a probability distribution over a set of potential points for the object has a high covariance).

SUMMARY

The following is a brief summary of subject matter that is described in greater detail herein. This summary is not intended to be limiting as to the scope of the claims.

Described herein are various technologies that pertain to controlling an AV based upon a neural-network-generated prediction of a trajectory (e.g., one or more future positions) of an object in the driving environment of the AV. With more specificity, described herein are various technologies pertaining to generating predictions of a trajectory of an object by way of a multi-headed recurrent neural network (RNN). The multi-headed RNN is configured to output probability data that indicates a probability of an object moving to a position at a future point in time for each of a plurality of object characteristics.

In an exemplary embodiment, the multi-headed RNN comprises a plurality of shared layers and a plurality of output heads, wherein each of the output heads receives a same state from a terminal layer in the shared layers. Each of the output heads of the multi-headed RNN is configured to output respective probability data indicating a probability of the object moving to a location in the driving environment. By way of example, a first output head outputs data indicating a probability of the object moving to a first location in the driving environment if the object is of a first object type (e.g., cyclist). Continuing the example, a second output head outputs data indicating a probability of the object moving to the first location in if the object is of a second object type (e.g., pedestrian).

In further embodiments, each of the output heads of the multi-headed RNN comprises one or more hidden layers and an output layer. Each of the output heads receives a same shared state from a hidden layer in the shared layers. In an example, each of the output heads receives, at a first hidden layer in its one or more hidden layers, a same output state of a terminal hidden layer in the shared layers of the multi-headed RNN. Therefore, each of the output heads outputs probability data of an object in the driving environment moving to a location based upon a same state from the shared layers of the multi-headed RNN.

In a subsequent time step, the multi-headed RNN can generate data indicating a probability that the object will move to a second location based in part upon values computed by the multi-headed RNN at the previous time step. In an example, at the subsequent time step, the output of one of the hidden layers in the shared layers is provided as input to the multi-headed RNN. The multi-headed RNN can therefore be configured to generate a prediction of a future trajectory of an object based upon a history of learned representations of the trajectory of the object at prior times (e.g., prior states of a hidden layer in the shared layers of the multi-headed RNN).

The technologies described herein present an improvement over conventional neural-network-based trajectory prediction. Specifically, technologies described herein pertaining to a multi-headed RNN improve runtime and computing resource utilization over approaches relying on parallel execution of multiple distinct and separate neural network predictors. Further, technologies described herein improve prediction accuracy over prior single-network predictors that are trained to predict trajectories of objects of an uncertain object type.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
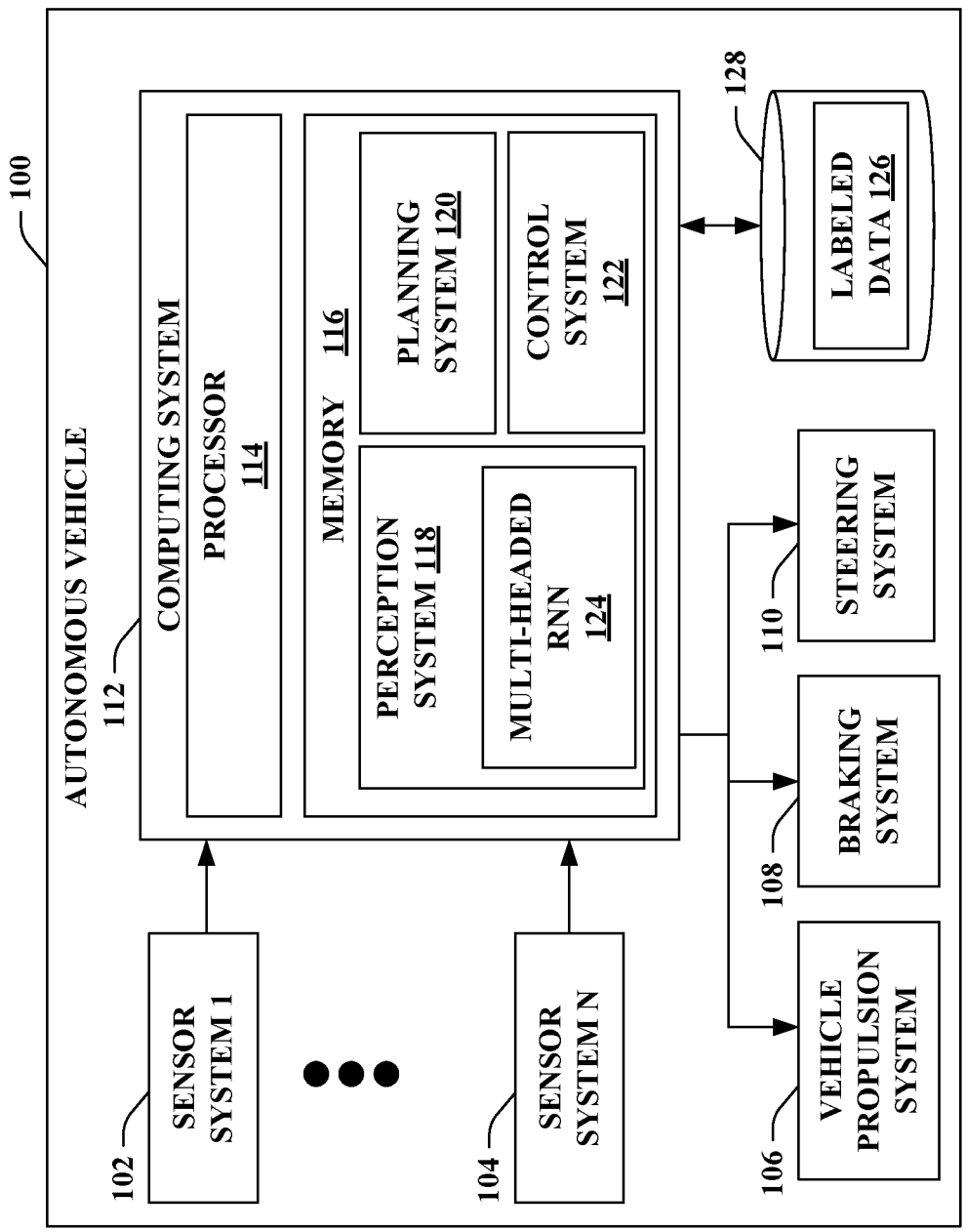
FIG. 1 illustrates a functional block diagram of an exemplary AV.

Various technologies pertaining to controlling an AV based upon predictions of a trajectory of an object in the driving environment, where the predictions are generated by way of a multi-headed RNN, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an AV 100. The AV 100 can navigate about roadways without human conduction based upon sensor signals outputted by sensor systems of the AV 100. The AV 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the AV 100. For example, the sensor system 1 102 may be a lidar sensor system and the sensor system N 104 may be a camera sensor (image) system. Other exemplary sensor systems included in the sensor systems 102-104 can include radar sensor systems, GPS sensor systems, sonar sensor systems, infrared sensor systems, and the like.

The AV 100 further includes several mechanical systems that are used to effectuate appropriate motion of the AV 100. For instance, the mechanical systems can include, but are not limited to, a vehicle propulsion system 106, a braking system 108, and a steering system 110. The vehicle propulsion system 106 can be an electric motor, an internal combustion engine, or a combination thereof. The braking system 108 can include an engine brake, brake pads, actuators, and/or any other suitable componentry that is configured to assist in decelerating the AV 100. The steering system 110 includes suitable componentry that is configured to control the direction of movement of the AV 100.

The AV 100 additionally includes a computing system 112 that is in communication with the sensor systems 102-104, the vehicle propulsion system 106, the braking system 108, and the steering system 110. The computing system 112 includes a processor 114 and memory 116. The memory 116 includes computer-executable instructions that are executed by the processor 114. Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 of the computing system 112 includes a perception system 118, a planning system 120, and a control system 122. The perception system 118 is generally configured to identify, track and classify objects (e.g., vehicles, pedestrians, cyclists, etc.) in a driving environment of the AV 100. The perception system 118 can further be configured to generate predictions of a future path of a detected object in the driving environment of the AV 100 based upon output of a multi-headed RNN, as will be described in greater detail below.

The planning system 120 is generally configured to plan a route that the AV 100 is to follow in its driving environment. The planning system 120 can be configured to plan a destination route that indicates a high-level path to be traveled by the AV 100 in connection with reaching a particular destination. For instance, the planning system 120 can generate a destination route for the AV 100 in terms of turn-by-turn directions from a present location of the AV 100 to a destination (e.g., a location to which a passenger riding in the AV 100 desires to travel). The planning system 120 is further configured to plan a maneuvering route that indicates how the AV 100 is to traverse its immediate driving environment (e.g., an intersection through which the AV 100 is traveling). In exemplary embodiments, the planning system 120 is configured to generate a maneuvering route for the AV 100 based upon data output by the perception system 118 that pertains to objects in the driving environment of the AV 100. By way of example, the planning system 120 can generate the maneuvering route for the AV 100 for a prescribed time period (e.g., through the next 5 seconds, through the next 10 seconds, through the next 30 seconds) based upon positions of objects in the driving environment (e.g., as indicated in position solutions output by the perception system 118). In further embodiments, the planning system 120 can access labeled data 126 stored in a data store 128 on the AV 100 in connection with generating the maneuvering route for the AV 100. The labeled data 126 can include a labeled semantic map of the driving environment of the AV 100 that includes locations of streets, lanes of traffic, traffic signals and road signs, sidewalks, buildings, etc.

The control system 122 is configured to control at least one of the mechanical systems of the AV 100 (e.g., at least one of the vehicle propulsion system 106, the braking system 108, and/or the steering system 110). By way of example, the control system 122 can be configured to output control signals to any of the vehicle propulsion system 106, the braking system 108, or the steering system 110 to cause such systems 106-110 to direct the AV 100 along a trajectory generated by the planning system 120. Moreover, the control system 122 can be configured to provide data corresponding to the control of the mechanical system(s) to the planning system 120. For instance, the control system 122 can provide data to the planning system 120 specifying the state of the AV 100 (e.g., a speed of the AV 100, an orientation of wheels of the AV 100, current power output of the vehicle propulsion system 106, etc.) Thus, the planning system 120 can plan a route that the AV 100 is to follow based upon data corresponding to the control of the mechanical system(s) received from the control system 122.

Figure 2:
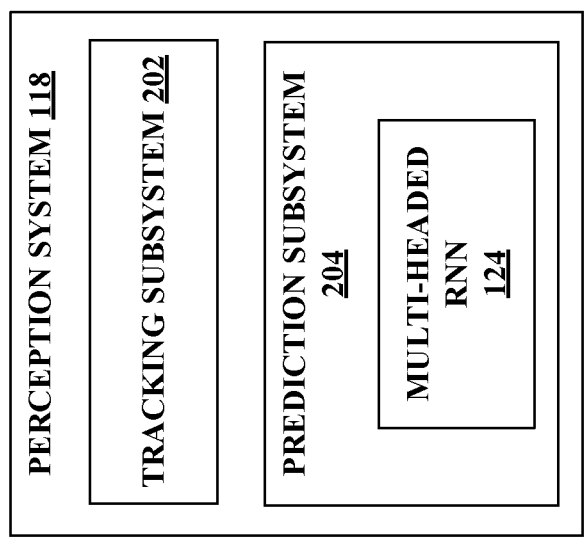
FIG. 2 illustrates a functional block diagram of an exemplary perception system of an AV.

Referring now to FIG. 2, a functional block diagram of the perception system 118 in various embodiments is illustrated. The perception system 118 includes a tracking subsystem 202 and a prediction subsystem 204. The tracking subsystem 202 is configured to identify the presence of objects in the driving environment of the AV 100 based upon sensor signals output by the sensor systems 102-104. The tracking subsystem 202 is further configured to classify identified objects in the driving environment according to one or more of several object types. In an exemplary embodiment, the tracking subsystem 202 is configured to classify identified objects in the driving environment as being motor vehicles, pedestrians, cyclists, motorcycles, trucks, static objects (e.g., utility poles, garbage cans, or other objects in the driving environment that are expected to be stationary), or unknown. It is to be appreciated that the tracking subsystem 202 can classify an object according to multiple object types. By way of example, an object classified generally as a vehicle can further be classified specifically as being a truck.

The tracking subsystem 202 is configured to track objects surrounding the autonomous vehicle 100. As such, the tracking subsystem 202 may be configured to interact with the plurality of sensor systems 102-104 in order to effectuate the tracking. In an example, when the plurality of sensor systems 102-104 include articulating (i.e., orientable) sensors, the tracking subsystem 202 may be configured to cause the articulating sensors to remain directed at objects in the driving environment of the autonomous vehicle 100 as the autonomous vehicle 100 is moving. In another example, the tracking subsystem 202 may be configured to control sensor systems in the plurality of sensor systems 102-104 such that objects remain tracked.

The tracking subsystem 202 is configured to generate a position solution for each of the identified objects in the driving environment of the AV 100. For a given object, the position solution identifies a position of the object in space. In embodiments, the position solution indicates the position of the object in absolute terms (e.g., a latitude-longitude-altitude triple) or relative terms (e.g., a three-dimensional position of the object relative to the AV 100). In exemplary embodiments, the position solution is indicative of a plurality of locations and a respective confidence value for each of the locations, the confidence values indicating a likelihood that the object occupies the location in space.

As noted above, the perception system 118 can further be configured to generate predictions of a future path of detected objects in the driving environment of the AV 100 based upon output of the multi-headed RNN 124. Accordingly, the prediction subsystem 204 is configured to predict future paths of objects (e.g., vehicles, people, etc.) in the driving environment by way of the multi-headed RNN 124. In an example, the prediction subsystem 204 may predict future paths of the objects for a period of time through the next 5 seconds, through the next 10 seconds, or through the next 30 seconds.

The multi-headed RNN 124 is trained to generate probability data that indicates a probability of an object moving to a position at a future time based on a position solution of the object (e.g., as output by the tracking subsystem 202). The multi-headed RNN 124 comprises a plurality of shared layers and a plurality of output heads. The shared layers include an input layer and at least one hidden layer. Each of the output heads comprises a plurality of neural network layers that includes at least one hidden layer and an output layer. The output heads of the multi-headed RNN 124 receive a same shared state from the plurality of shared layers of the multi-headed RNN 124. In exemplary embodiments, the output heads of the multi-headed RNN 124 are independent, in that each of the output heads receives a same shared state from the shared layers of the multi-headed RNN 124, but does not receive data from any of the other output heads.

The multi-headed RNN 124 is trained such that each of the output heads outputs respective probability data by way of its output layer. The probability data output by an output head is indicative of a probability that an object in the driving environment will move to a location if the object has a particular characteristic. By way of example, the multi-headed RNN 124 can include a first output head and a second output head, wherein the first output head outputs first probability data and the second output head outputs second probability data. In the example, the first probability data indicates a probability of an object in the driving environment moving to a given position at a future time if the object has a first characteristic. The second probability data indicates a probability of the object moving to the given position at the future time if the object has a second characteristic.

Various details pertaining to the multi-headed RNN are now described with reference to FIG. 3, which depicts a block diagram of the multi-headed RNN 124 in various embodiments. The multi-headed RNN 124 comprises a plurality of shared layers 302 and a plurality of output heads, namely an output head 1 304 . . . an output head M 306, where M can be substantially any integer greater than 1 (collectively referred to herein as output heads 304-306).

The shared layers 302 include an input layer 308 and a plurality of hidden layers 310, wherein the plurality of hidden layers 310 include a terminal layer 312. The output head 1 304 includes a hidden layer 314 and an output layer 316. Similarly, the output head M 306 includes a hidden layer 318 and an output layer 320. It is to be understood that while reference is made to a hidden layer 314 and a hidden layer 318 in the output heads 304-306, the output heads 304-306 can include a plurality of hidden layers. The shared layers 302 and the layers 314-320 of the output heads 304-306 each comprise respective pluralities of nodes.

In an exemplary execution of the multi-headed RNN 124 in connection with predicting a future position of an object in the driving environment, data pertaining to the object is provided as input to the multi-headed RNN 124 at the input layer 308. The input data includes a position solution for the object (e.g., as output by the tracking subsystem 202). The position solution indicates a position of the object in the driving environment at the present time or a known time in the past. The input data can include additional data pertaining to the object or the driving environment. In embodiments, the input data further includes data indicative of a velocity of the object, a type of the object, a confidence value associated with a classification of the type of the object, positions of other moving objects in the driving environment, positions of static objects in the driving environment, positions of traffic signs or signals, positions of traffic lanes, or substantially any other information pertinent to predicting a future location of a moving object in the driving environment. In exemplary embodiments, these input data can be derived from sensor signals output by the sensor systems 102-104 or from the labeled data 126.

Subsequent to the input data being received at the input layer 308, the input data is propagated forward through the shared layers 302 from one layer to the next according to conventional neural network techniques. For example, data output by a node in one of the layers 302 can be a function of a weighted sum of the data received at the node, wherein the received data is received from nodes in a previous layer in the layers 302.

The terminal layer 312 outputs a same shared state to each of the output heads 304-306. The shared state can be represented as a vector $v=[v_1, v_2, \ldots, v_n]$ where $v_n$ is a value output by an nth node in the terminal layer 312. The shared state is propagated through the hidden layers 314, 318 of each of the output heads 304-306 to the output layers 316, 320. Based upon a state received from the hidden layers 314, 318, respectively, the output layers 316, 320 each output probability data indicating a probability that the object moves to a position at a future time. With more particularity, the output layer 316 receives a first state from the hidden layers 314 (e.g., as output by the hidden layers 314 based upon propagating the shared state of the terminal layer 312 through the hidden layers 314) and outputs first probability data. The output layer 320 receives an Mth state from the hidden layers 318 and outputs Mth probability data. The first probability data is indicative of a probability of the object moving to a first position at a future time when the object has a first characteristic. The Mth probability data is indicative of a probability of the object moving to the first position at the future time when the object has an Mth characteristic.

From the foregoing, it is to be understood that the multi-headed RNN 124 is configured to output probabilities that an object will move to a location at a future point in time under assumption of the object having each of several different object characteristics. In exemplary embodiments, the multi-headed RNN 124 can be used to simultaneously indicate based on the object being classified as each of a plurality of potentially mutually exclusive object types. Thus the multi-headed RNN 124 is well-suited to use in connection with predicting trajectories of objects that are difficult to classify into different categories.

In various embodiments, the multi-headed RNN 124 is configured such that the probability data output by the output heads 304-306 are indicative of respective two-dimensional Gaussian distributions. In these embodiments, the Gaussian distributions are probability distributions indicating a probability that an object in the driving environment will move to any of a plurality of points in space about the AV 100 at some future time. In an exemplary embodiment, the Gaussian distributions are defined over a two-dimensional space that corresponds to a top-down view of the driving environment of the AV 100. In some embodiments, the probability data output by the output heads 304-306 represent a sequence of two-dimensional Gaussian distributions, wherein each of the Gaussian distributions in the sequence is representative of a different future time. For a single execution of the multi-headed RNN 124, the probability data output by the output heads 304-306 can be indicative of a two-dimensional Gaussian distribution of points in space for each of a plurality of future times.

In exemplary embodiments, the AV 100 is configured such that the planning system 120 computes a planned maneuver for the AV 100 based upon probabilities associated with the object characteristics corresponding to the output heads 304-306 of the multi-headed RNN 124. By way of example, and not limitation, the object heads 304-306 can be associated with respective object types. The perception system 118 can further be configured to output a probability for each of a plurality of object types, each probability indicating a likelihood that an object in the driving environment is of a given type. The AV 100 can be configured such that the planning system 120 generates a planned maneuver for the AV 100 based upon both the probability data output by the multi-headed RNN 124 and the probabilities associated with the various object types. In a non-limiting example, where the perception system 118 indicates a 50% probability that an object in the driving environment is a bicycle, and the multi-headed RNN 124 indicates a 75% probability of the object moving to a particular location at a future time given that the object is a bicycle, the planning system 120 can compute a maneuver for the AV 100 based on a 37.5% chance that a bicycle will be at the given location at the future time.

The multi-headed RNN 124 can be successively executed during operation of the AV 100 in the driving environment to continually update a predicted position of an object detected by the tracking subsystem 202. For example, subsequent to the exemplary execution of the multi-headed RNN 124 described above, the shared state that was provided to the output heads 304-306 by the terminal layer 312 is provided to the input layer 308 as part of the input data for another execution of the multi-headed RNN 124. Thus, the multi-headed RNN 124 is configured such that state data of one or more layers of the multi-headed RNN 124 (e.g., data output by the one or more layers in connection with generating probability data by way of the multi-headed RNN 124) is used to generate future predictions of a position of an object by way of the multi-headed RNN 124. Carrying a state of one of the shared layers 302 forward to a next iteration of prediction by way of the multi-headed RNN 124 allows a learned representation of the history of inputs to the multi-headed RNN 124 to be retained, improving the quality of trajectory predictions for a same object in successive iterations.

In an example, an output state is generated at a first time by the terminal layer 312 in connection with predicting a position of an object at second time that is subsequent to the first time. The output state generated by the terminal layer 312 at the first time can be provided to the input layer 308 at a third time in connection with predicting a position of the object at a fourth time that is subsequent to the third time.

The output heads 304-306 can be configured such that the output layers 316, 320 output probability data relative to each of a plurality of secondary object characteristics. With reference to the exemplary execution of the multi-headed RNN 124 described above, probability data output by the output head M 306 can be indicative of a first probability of the object moving to a location when the object has the Mth characteristic and a first secondary characteristic. The probability data output by the output head M 306 can be further indicative of a second probability of the object moving to a location when the object has the Mth characteristic and a second secondary characteristic. By way of example, the primary characteristic can be an object type, and the secondary characteristic can be a current state of motion of the object (e.g., moving, stationary, or ambiguous). By way of further illustration, the first probability data referenced above can be indicative of the probability of the object moving to a location if the object is a moving bicycle, and the second probability data can be indicative of the probability of the object moving to the location if the object is a stationary bicycle. In an exemplary embodiment, probability data corresponding to each of a plurality of secondary characteristics of the object are output at respective nodes of the output layer of an output head. Referring again to the examples above, the first probability data can be output by way of a first node of the output layer 320 of the output head M 306. Similarly, the second probability data can be output by way of a second node of the output layer 320 of the output head M 306.

The technologies described herein present several advantages over other neural-network-based trajectory prediction methods. For example, the multi-headed RNN 124 generally requires fewer computational resources (e.g., time or processing cycles) to generate probability data relative to a future position of an object for multiple object classifications than separate neural networks for each classification. Furthermore, use of the multi-headed RNN 124 as described herein reduces the amount of time required to transfer data between processing units of the AV 100 (e.g., a CPU and a GPU). In another example, the multi-headed RNN 124 preserves historical state information relative to past predictions of a trajectory of an object (e.g., by way of providing the shared state of the terminal layer 312 as input to the multi-headed RNN 124 for future predictions). This allows the multi-headed RNN 124 to more accurately predict future positions of an object based on past behavior of the object than approaches that lose history of the neural network state when the classification of the object changes.

Figure 4:
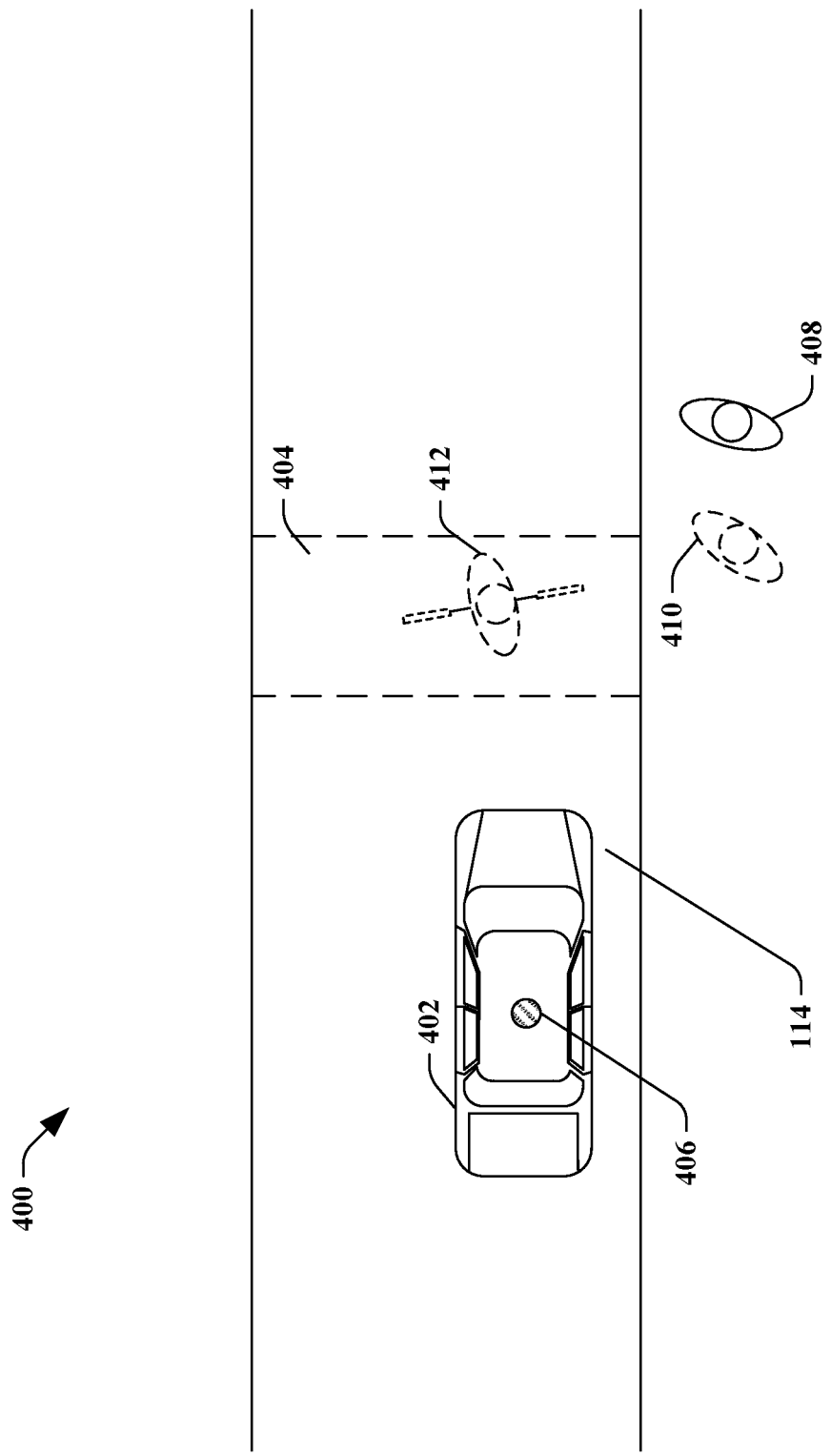
FIG. 4 illustrates an exemplary driving environment of an AV that includes a pedestrian.

Various non-limiting examples are now set forth with respect to operation of an autonomous vehicle in several different driving environments. Referring now to FIG. 4, an exemplary driving environment 400 is illustrated wherein an AV 402 is approaching a crosswalk 404. As the AV 402 approaches the crosswalk, one or more sensors (e.g., included on a sensor platform 406 located on the vehicle 402) indicate presence of an object 408. The object 408 as shown in FIG. 4 is a pedestrian, but the AV 402 may be unable to determine based on output of the sensors whether, for example, the object 408 is a pedestrian or a bicycle. A multi-headed RNN installed on the AV 402 can be configured to output first probability data indicating probabilities of the object 408 moving to different positions at a future time if the object 408 is a pedestrian. The multi-headed RNN can further be configured to output second probability data indicating probabilities of the object 408 moving to different positions at the future time if the object 408 is a bicycle. For instance, the multi-headed RNN can indicate that there is a high probability that the object 408 moves to a first position 410 if the object is a pedestrian, and that there is a high probability that the object 408 moves to a second position 412 if the object 408 is a bicycle. The AV 402 can be configured such that operation of the AV 402 is controlled based on such probability data. In an example, the AV 402 can engage a braking system responsive to determining that there is a significant likelihood that the object 408 will move into a path of the vehicle 402.

Figure 5:
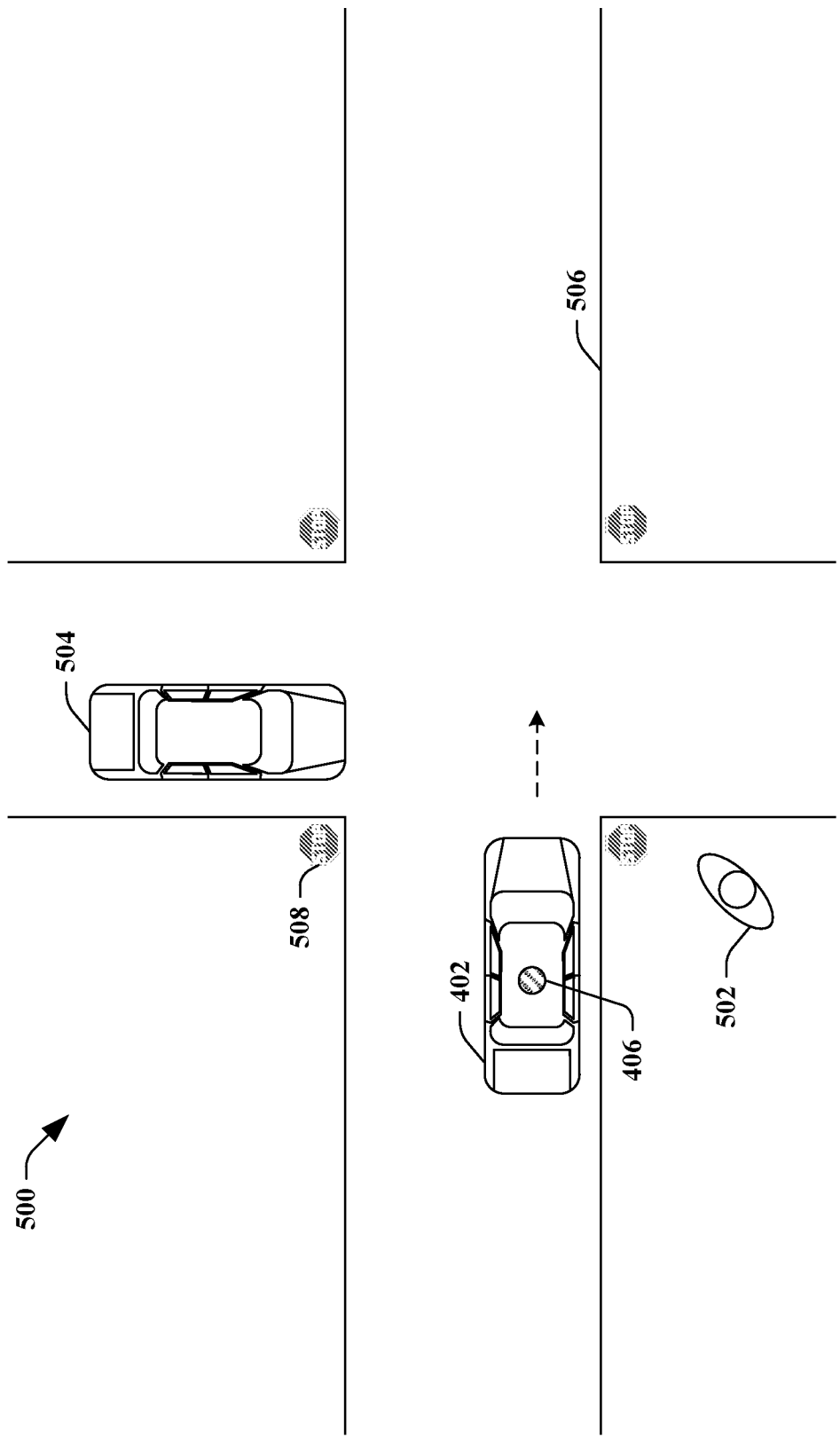
FIG. 5 illustrates another exemplary driving environment of an AV that includes a pedestrian and another vehicle.

As noted above, various features pertaining to the driving environment of the AV 100 can be included as input to the multi-headed RNN 124. By way of an example, and referring now to FIG. 5, a driving environment 500 is illustrated wherein the AV 402 is positioned at a four-way-stop intersection. The driving environment 500 further includes a pedestrian 502 and a vehicle 504. The multi-headed RNN installed on the AV 402 can be configured to output probability data pertaining to future positions of the pedestrian 502 and the vehicle 504 based upon features of the four-way-stop intersection. For example, locations of roadway boundaries 506 and stop signs 508 can be provided as input to the multi-headed RNN. The multi-headed RNN can output probability data for each of the pedestrian 502 and the vehicle 504 based on such locations. For instance, the multi-headed RNN can be trained such that the multi-headed RNN will typically indicate a low probability of the vehicle 504 traveling outside the roadway boundaries 506.

Figure 6:
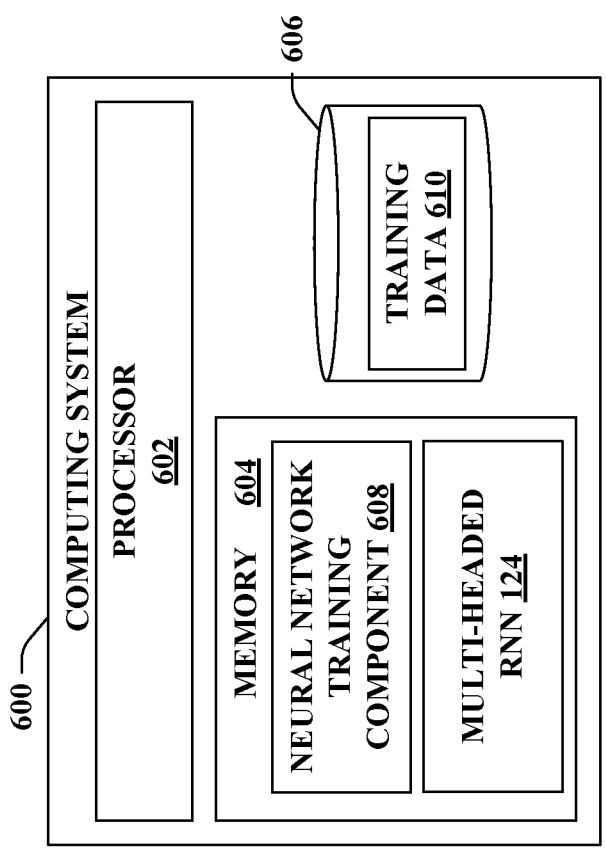
FIG. 6 illustrates a functional block diagram of an exemplary computing device for training a multi-headed RNN.

Referring now to FIG. 6, a functional block diagram of an exemplary computing system 600 for use in connection with training the multi-headed RNN 124 is shown. The computing system 600 includes a processor 602, memory 604 that stores computer-executable instructions, and a data store 606. The memory 604 includes a neural network training component 608 and the multi-headed RNN 124. The data store 606 stores training data 610. The neural network training component 608 is configured to train the multi-headed RNN 124 based upon the training data 610. The training data 610 includes data parameterized according to features desirably used as input to the multi-headed RNN 124, such as those set forth in the description above with respect to input to the multi-headed RNN 124. By way of example, and not limitation, the training data 610 can include position solutions of objects in a driving environment, data pertaining to stationary objects in a driving environment (e.g., roadways, stop signs, buildings, etc.), or substantially any other data desirably used as input to the multi-headed RNN 124. The training data 610 can further include ground truth data pertaining to desired outputs of the multi-headed RNN 124. In an example, the training data 610 can include actual observed positions of objects in a driving environment over time. In embodiments, the neural network training component 608 trains the multi-headed RNN 124 to optimize the outputs of the multi-headed RNN 124 relative to a cost function based upon the ground truth data. While not shown, the multi-headed RNN 124 can be validated based upon a test training data set, which is also labeled, to ensure that the multi-headed RNN 124 produces outputs with acceptable characteristics.

Figure 3:
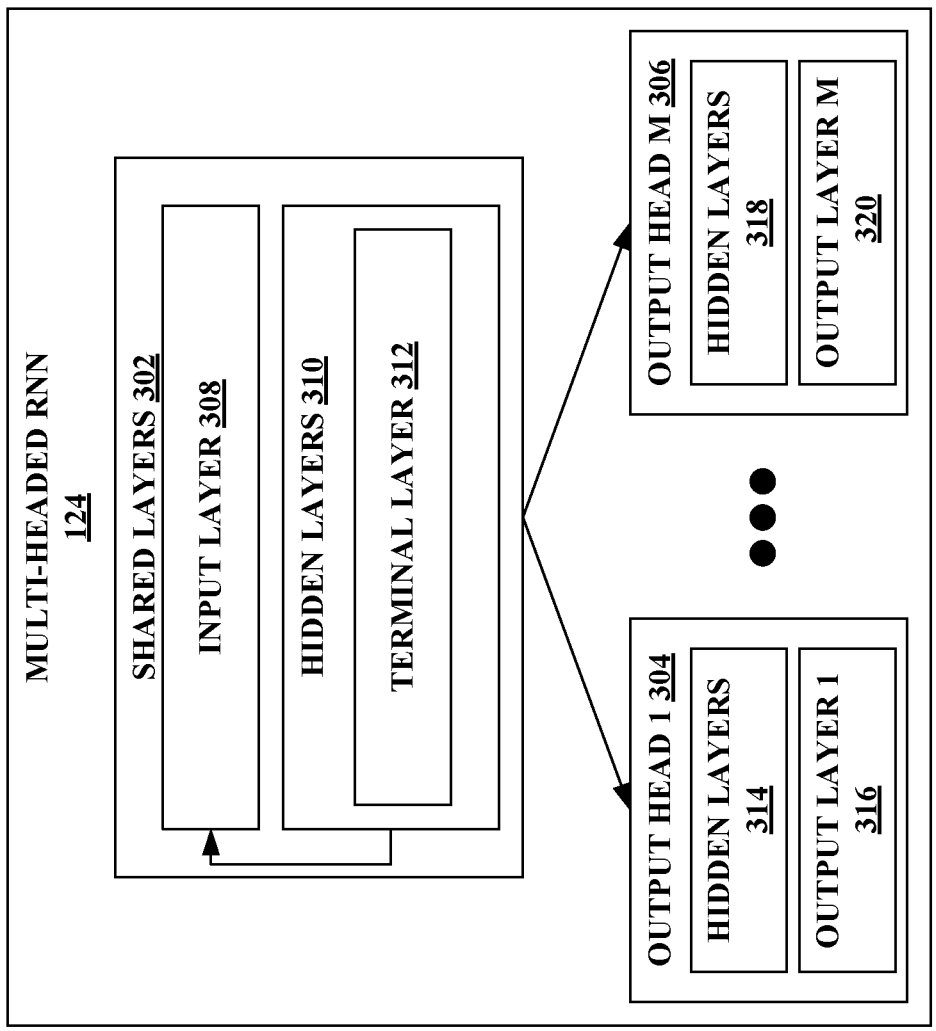
FIG. 3 illustrates a functional block diagram of an exemplary multi-headed RNN.

With reference now to FIGS. 3 and 6, the neural network training component 608 trains each of the output heads on different data in the training data 610. In an exemplary embodiment, the neural network training component 608 trains the first output head 304 on first data in the training data 610, the first data pertaining to Hence, the neural network training component 608 trains the multi-headed RNN 124 such that each of the output heads 304-306 is trained on data of a different type (e.g., corresponding to an object characteristic associated with the output head), whereas the shared layers 302 are trained on data that includes each of the types associated with the output heads 304-306.

An exemplary embodiment is now described. In the embodiment, the training data 610 includes data pertaining to objects having a first characteristic, and data pertaining to objects having a second characteristic. For instance, the training data 610 can include data pertaining to pedestrians in a driving environment and data pertaining to cyclists in a driving environment. Output head 1 304 can be trained based upon the data pertaining to pedestrians, and output head M 306 can be separately trained based upon the data pertaining to cyclists. With more particularity, in connection with training output head 1, input features in the training data 610 relative to pedestrians are input to the input layer 308 and propagated through the shared layers 302. The state of the terminal layer 312 is then provided only to output head 1 304. The state of the terminal layer 312 is propagated through the hidden layers 314 to output layer 1 316. Weights associated with nodes in the layers of output head 1 304 and the shared layers 302 are updated based upon backpropagation of errors from the output layer 316 to the input layer 308. In connection with training output head M 306, input features in the training data 610 relative to cyclists are input to the input layer 308 and propagated through the shared layers 302. The state of the terminal layer 312 is now provided to the output head M 306, and propagated through the hidden layers 318 to output layer M 320. Weights associated with nodes in the layers of output head M 320 and the shared layers 302 are updated based up on backpropagation of errors from the output layer M 320 to the input layer 308. Thus, output head 1 304 is trained on data of a first type, output head M 306 is trained on data of a second type, and the shared layers 302 of the multi-headed RNN 124 are trained on data of both the first type and the second type.

It is to be understood that the training data 610 can include machine labeled data, and thus there may be some errors associated with which types of the training data 610 are used to train each of the output head 1 304 and the output head M 306. Further, it is to be understood that at least a portion of the data used to train the outputs heads 304-306 can be shared in common. By way of example, input features relating to entities such as roads, stop signs, or other static objects may be shared in common between training output head 1 304 and output head M 306.

Figure 7:
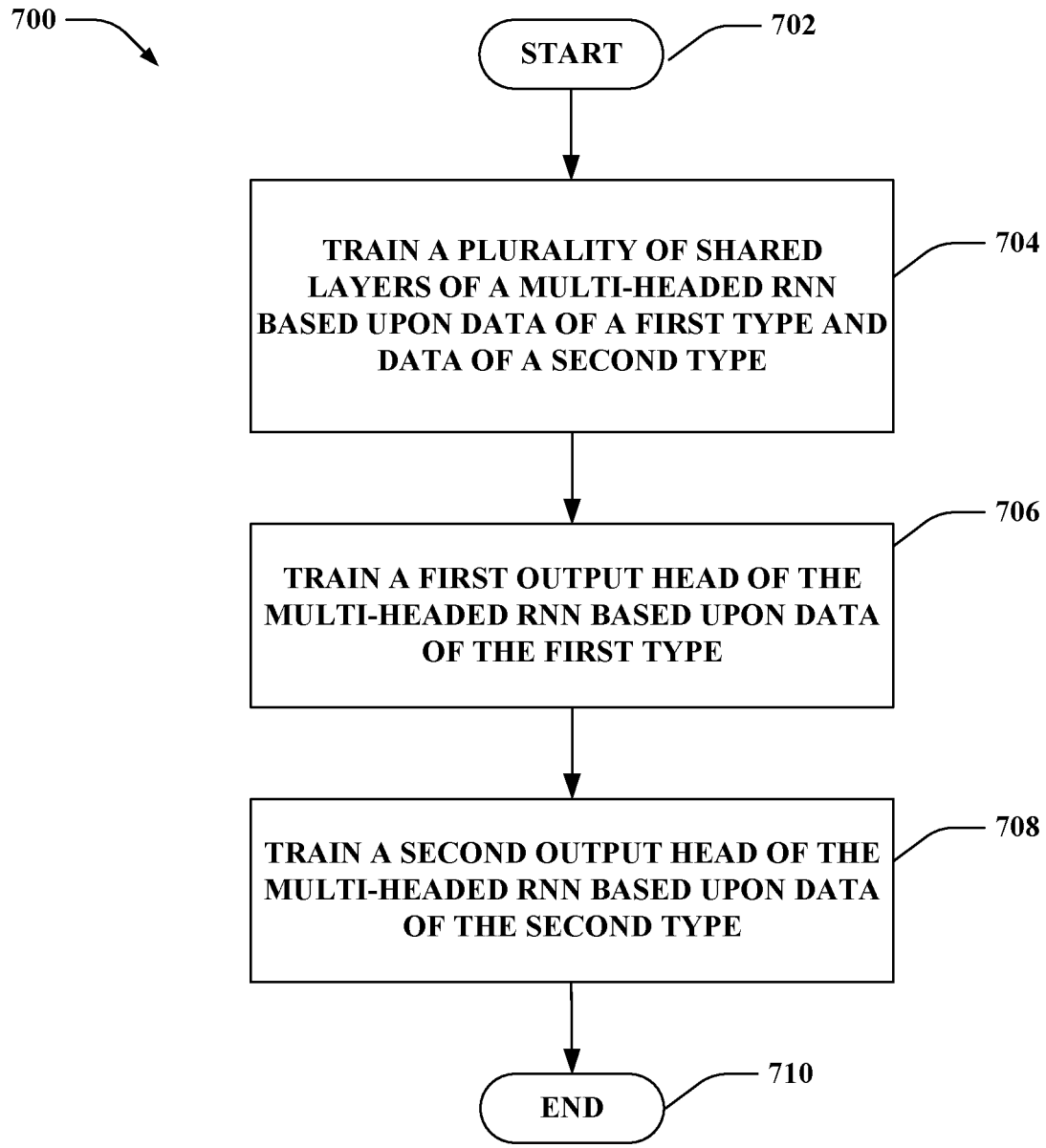
FIG. 7 is a flow diagram that illustrates an exemplary methodology for training a multi-headed RNN.
Figure 8:
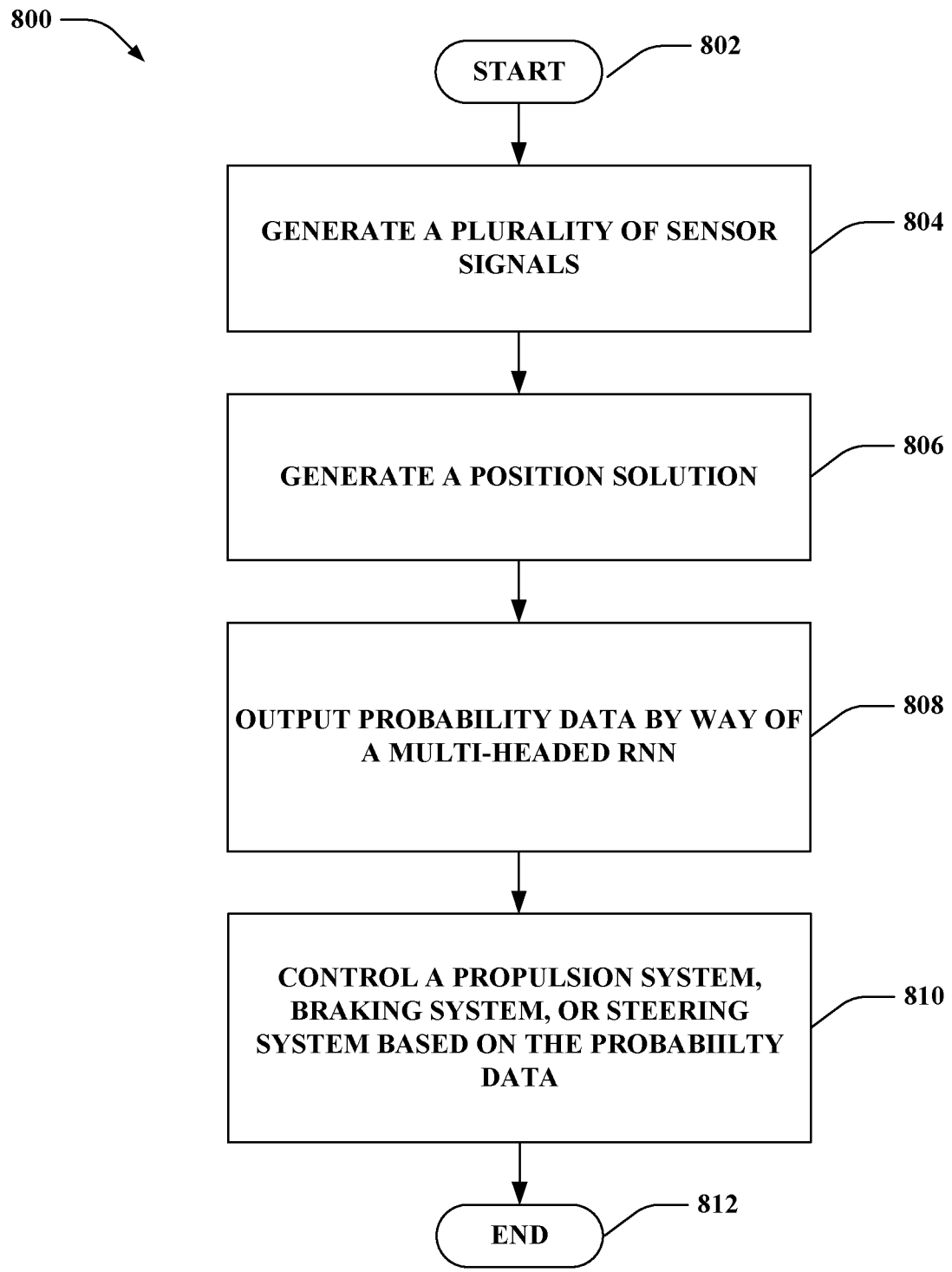
FIG. 8 is a flow diagram that illustrates an exemplary methodology for controlling an AV based upon probability generated by way of a multi-headed RNN.

FIGS. 7 and 8 illustrate exemplary methodologies relating to controlling an AV based upon output of a multi-headed RNN. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 7, an exemplary methodology 700 performed in connection with training a multi-headed RNN to generate probability data relative to objects in a driving environment of an AV is illustrated. The methodology 700 begins at 702, and at 704, a plurality of shared layers of a multi-headed RNN are trained based upon data that includes data of a first type and data of a second type. For example, the first type of data can be data representative of objects that have a first characteristic, and the second type of data can be data representative of objects that have a second characteristic. At 706, a first output head of a multi-headed RNN is trained based upon data of the first type. Continuing the example, the first output head can be trained based upon data of the first type and not the second type in order to be configured to output probability data relative to future positions of an object when the object has the first characteristic. At 708, a second output head of the multi-headed RNN is trained based upon data of a second type. Continuing the example further, the second output head can be trained based upon data of the second type and not the first type in order to be configured to output probability data relative to future positions of an object when the object has the second characteristic. The methodology 700 completes at 710.

Turning to FIG. 8, an exemplary methodology 800 for controlling an AV based upon output of a multi-headed RNN is illustrated. The methodology 800 begins at 802 and at 804 a plurality of sensor signals are generated by way of a plurality of sensor systems of the AV, where the sensor signals are indicative of one or more objects in the driving environment. For instance, the sensor signals can be indicative of other vehicles, pedestrians, cyclists, or other objects in the driving environment of the AV. At 806, a position solution is generated based on the sensor signals, the position solution indicating of a position of an object in the driving environment. At 808, probability data is output by way of a multi-headed RNN, where the probability is indicative of a probability of the object at the position moving to a second position at a future time. The multi-headed RNN includes a first output head and a second output head that output respective first and second probability data. The first probability data is indicative of a probability of the object moving to the second position at the future time when the object has a first object characteristic. The second probability data is indicative of a probability of the object moving to the second position at the future time when the object has a second object characteristic. In exemplary embodiments, the first output head and the second output head receive a same shared state from a plurality of shared layers of the multi-headed RNN. At 810, at least one of a propulsion system, a braking system, or a steering system of the AV is controlled based upon the probability data, whereupon the methodology 800 ends 812.

Figure 9:
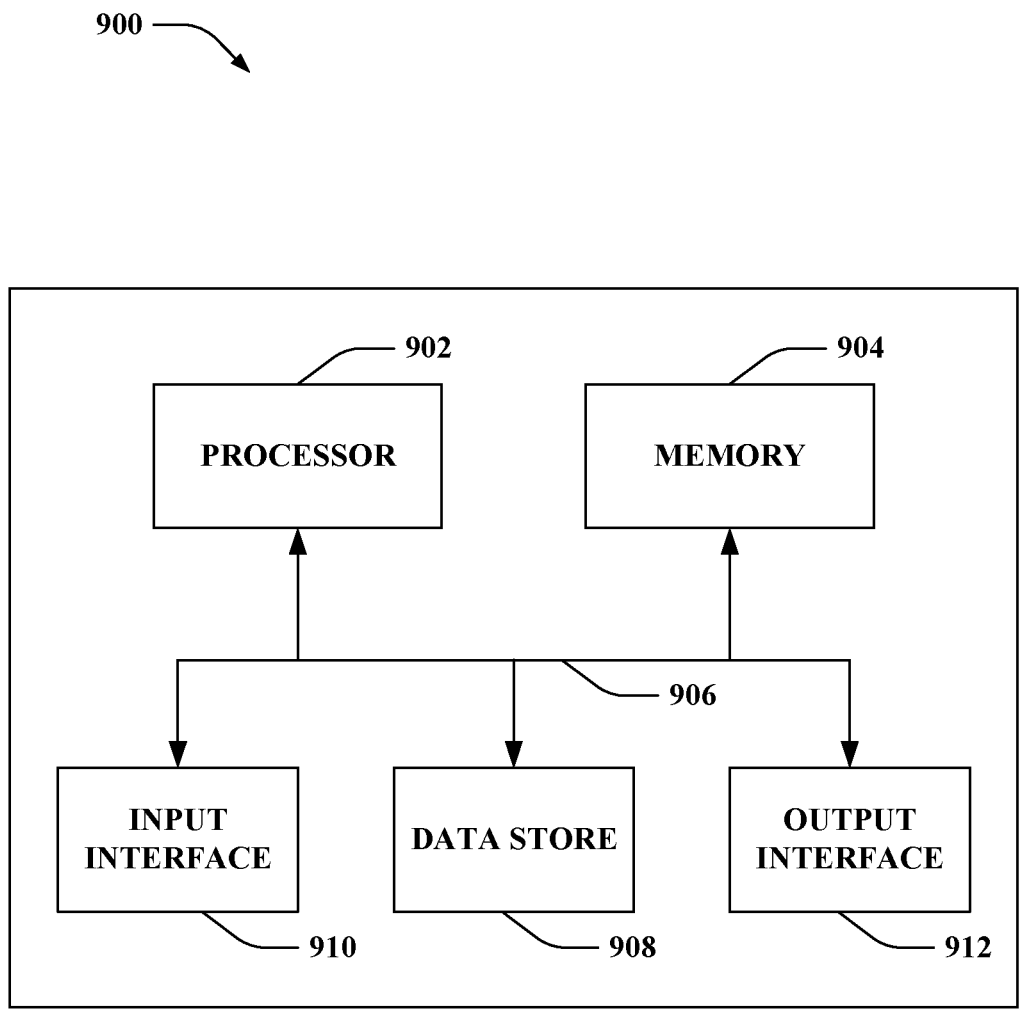
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be or include either of the computing systems 112, 600. The computing device 900 includes at least one processor 902 that executes instructions that are stored in a memory 904. The instructions may be, for instance, instructions for implementing functionality described as being carried out by one or more systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store data pertaining to objects in a driving environment of an autonomous vehicle, parameters associated with a multi-headed RNN, and so forth.

The computing device 900 additionally includes a data store 908 that is accessible by the processor 902 by way of the system bus 906. The data store 908 may include executable instructions, data pertaining to a driving environment of an autonomous vehicle, computer-implemented machine learning models, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle (AV), comprising:
   a plurality of sensor systems that generate a plurality of sensor signals, the plurality of sensor signals indicative of an object in a driving environment of the AV; and
   a computing system that is in communication with the plurality of sensor systems, wherein the computing system comprises:
   a processor; and
   memory that stores computer-executable instructions that, when executed by the processor, cause the processor to perform acts comprising:
      generating, based upon the sensor signals, a position solution that is indicative of a first position of the object at a first time;
      outputting probability data that is indicative of a probability of the object moving to a second position at a second time by way of a multi-headed recurrent neural network (RNN), wherein the position solution is provided as input to the multi-headed RNN in connection with outputting the probability data, and wherein the multi-headed RNN comprises:
         a first head, the first head configured to output first probability data that is indicative of a probability of the object moving to the second position at the second time based on a first characteristic of the object; and
         a second head, the second head configured to output second probability data that is indicative of a probability of the object moving to the second position at the second time based on a second characteristic of the object, the probability data comprising the first probability data and the second probability data; and
      controlling at least one of a propulsion system, a braking system, or a steering system of the AV based upon the probability data.

2. The AV of claim 1, wherein the multi-headed RNN further comprises a plurality of shared layers wherein the first head and the second head receive a same output state from the shared layers.

3. The AV of claim 2, the acts further comprising outputting third probability data by way of the multi-headed RNN, the third probability data indicative of a probability of the object moving to a third position at a third time, wherein the output state of the shared layers is provided as input to the multi-headed RNN in connection with outputting the third probability data.

4. The AV of claim 2, wherein the plurality of shared layers are trained on first training data that includes data of a first type and data of a second type.

5. The AV of claim 4, wherein the first head of the multi-headed RNN is trained on second training data that includes only data of the first type.

6. The AV of claim 5, wherein the second head of the multi-headed RNN is trained on third training data that includes only data of the second type.

7. The AV of claim 1, wherein the first head comprises a first plurality of layers and the second head comprises a second plurality of layers.

8. The AV of claim 1, wherein an input to the multi-headed RNN in connection with outputting the probability data further comprises at least one of:
a velocity of the object;
a probability of the object being of a first object type;
labeled data pertaining to the driving environment; and
data indicative of other objects in the driving environment of the AV.

9. The AV of claim 1, wherein the first characteristic is a first object type and the second characteristic is a second object type.

10. The AV of claim 9, wherein the first object type indicates that the object is one of:
a car;
a motorcycle
a cyclist; or
a pedestrian.

11. The AV of claim 1, wherein the first head comprises a first plurality of hidden layers and a first output layer, and wherein the second head comprises a second plurality of hidden layers and a second output layer.

12. The AV of claim 11, wherein the first hidden layers of the first head do not receive input from the second hidden layers of the second head, and wherein the second hidden layers of the second head do not receive input from the first hidden layers of the first head.

13. The AV of claim 1, wherein the probability data comprises data indicative of a two-dimensional probability distribution, the two-dimensional probability distribution indicating a respective probability of the AV moving to each of a plurality of points in the driving environment at the second time.

14. A method for controlling an autonomous vehicle (AV), the method comprising:
generating a plurality of sensor signals by way of a plurality of sensor systems on the AV, the plurality of sensor signals indicative of an object in a driving environment of the AV
generating, based upon the sensor signals, a position solution that is indicative of a first position of the object at a first time;
outputting probability data that is indicative of a probability of the object moving to a second position at a second time by way of a multi-headed recurrent neural network (RNN), wherein the position solution is provided as input to the multi-headed RNN in connection with outputting the probability data, and wherein the multi-headed RNN comprises:
a first head, the first head configured to output first probability data that is indicative of a probability of the object moving to the second position at the second time based on a first characteristic of the object; and
a second head, the second head configured to output second probability data that is indicative of a probability of the object moving to the second position at the second time based on a second characteristic of the object, the probability data comprising the first probability data and the second probability data; and
controlling at least one of a propulsion system, a braking system, or a steering system of the AV based upon the probability data.

15. The method of claim 14, wherein the first probability data comprises third probability data and fourth probability data, wherein the third probability data is indicative of a probability of the object moving to the second position at the second time based on the first characteristic of the object and a third characteristic of the object, and wherein the fourth probability data is indicative of a probability of the object moving to the second position at the second time based on the first characteristic of the object and a fourth characteristic of the object.

16. The method of claim 15, wherein the third characteristic of the object is the object being in motion, and wherein the fourth characteristic of the object is the object being stopped.

17. The method of claim 14, wherein the multi-headed RNN further comprises a shared layer that outputs a shared state, and wherein the first head outputs the first probability data based upon the shared state and the second head outputs the second probability data based upon the shared state.

18. The method of claim 17, further comprising providing the shared state as input to an input layer of the multi-headed RNN in connection with outputting third probability data indicative of a probability of the object moving to a third location at a third time.

19. An autonomous vehicle (AV), comprising:
a plurality of sensor systems that generate a plurality of sensor signals, the plurality of sensor signals indicative of an object in a driving environment of the AV; and
a computing system that is in communication with the plurality of sensor systems, wherein the computing system comprises:
a processor; and
memory that stores computer-executable instructions that, when executed by the processor, cause the processor to perform acts comprising:
generating, based upon the sensor signals, a position solution that is indicative of a first position of the object at a first time;
outputting probability data that is indicative of a probability of the object moving to a second position at a second time by way of a multi-headed recurrent neural network (RNN), wherein the position solution is provided as input to the multi-headed RNN in connection with outputting the probability data, and wherein the multi-headed RNN comprises:
a plurality of shared layers, the shared layers including a terminal layer that outputs a shared state;
a first head that receives the shared state from the terminal layer, the first head configured to output first probability data based upon the shared state, the first probability data indicative of a probability of the object moving to the second position when the object has a first characteristic; and a second head that receives the shared state from the terminal layer, the second head configured to output second probability data based upon the share state, the second probability data indicative of a probability of the object moving to the second position at the second time when the object has the second characteristic, the probability data comprising the first probability data and the second probability data; and controlling at least one of a propulsion system, a braking system, or a steering system of the AV based upon the probability data.

20. The AV of claim 19, the acts further comprising providing the shared state as input to the multi-headed RNN in connection with outputting third probability data by way of the multi-headed RNN, the third probability data indicative of a probability of the object moving to a third location at a third time.

\* \* \* \* \*